United States Patent
Kurki-Suonio

(10) Patent No.: US 9,123,343 B2
(45) Date of Patent: Sep. 1, 2015

(54) METHOD, AND A DEVICE FOR CONVERTING SPEECH BY REPLACING INARTICULATE PORTIONS OF THE SPEECH BEFORE THE CONVERSION

(75) Inventor: Risto Kurki-Suonio, Helsinki (FI)

(73) Assignee: MOBITER DICTA OY, Helsinki (FI)

( * ) Notice: Subject to any disclaimer, the term of this patent is extended or adjusted under 35 U.S.C. 154(b) by 799 days.

(21) Appl. No.: 12/298,697

(22) PCT Filed: Apr. 27, 2006

(86) PCT No.: PCT/FI2006/000135
§ 371 (c)(1),
(2), (4) Date: May 28, 2009

(87) PCT Pub. No.: WO2007/125151
PCT Pub. Date: Nov. 8, 2007

(65) Prior Publication Data
US 2009/0319267 A1    Dec. 24, 2009

(51) Int. Cl.
G10L 15/00    (2013.01)
G10L 21/00    (2013.01)
G10L 15/26    (2006.01)
G10L 15/30    (2013.01)
G10L 15/22    (2006.01)

(52) U.S. Cl.
CPC .............. *G10L 15/30* (2013.01); *G10L 15/265* (2013.01); *G10L 15/22* (2013.01)

(58) Field of Classification Search
CPC ..... G06F 17/289; G10L 15/265; G10L 15/22; G10L 17/005
USPC .......................................... 704/2, 270, 270.1
See application file for complete search history.

(56) References Cited

U.S. PATENT DOCUMENTS

| | | | |
|---|---|---|---|
| 6,266,642 B1 | 7/2001 | Franz et al. | |
| 6,532,446 B1 | 3/2003 | King | |
| 7,027,989 B1 * | 4/2006 | Tapadar et al. | 704/270 |
| 7,174,509 B2 * | 2/2007 | Sakai et al. | 715/201 |
| 7,643,985 B2 * | 1/2010 | Horvitz | 704/2 |
| 2003/0028380 A1 * | 2/2003 | Freeland et al. | 704/260 |
| 2003/0182113 A1 | 9/2003 | Huang | |
| 2004/0122666 A1 | 6/2004 | Ahlenius | |
| 2004/0176952 A1 * | 9/2004 | Fado et al. | 704/233 |
| 2005/0131709 A1 * | 6/2005 | Creamer et al. | 704/277 |
| 2005/0144012 A1 * | 6/2005 | Afrashteh et al. | 704/277 |
| 2006/0009980 A1 * | 1/2006 | Burke et al. | 704/270 |
| 2007/0112571 A1 * | 5/2007 | Thirugnana | 704/270 |

FOREIGN PATENT DOCUMENTS

EP    1215659    6/2002

OTHER PUBLICATIONS

International Search Report corresponding to the PCT application, Mar. 5, 2010.

(Continued)

*Primary Examiner* — Farzad Kazeminezhad
(74) *Attorney, Agent, or Firm* — Young & Thompson

(57) ABSTRACT

An arrangement for converting speech into text comprises a mobile device (202) and a server entity (208) configured to perform the conversion and additional optional processes in co-operation. The user of the mobile device (202) may locally edit the speech signal prior to or between the execution of the actual speech recognition tasks, by replacing an inarticulate portion of the speech signal with a new version being recording of the portion. Task sharing details can be negotiated dynamically based on a number of parameters.

14 Claims, 6 Drawing Sheets

(56) References Cited

OTHER PUBLICATIONS

Jan Nouza, "Training Speech Through Visual Feedback Patterns" The 5th International Conference on Spoken Language Processsing (ICSLP), Nov. 30, 1998, p. 1139, Sydney, Australia.

Rainer Gruhn et al: "Cellular-Phone Based Speech-To-Speech Transla Tion System ATR-Matrix" Inernational Conference on Spoken Language Processing (ICSLP),Oct. 16, 2000, pp. 448-451,Beijing, China.

Extended European Search Report in Corresponding Application EP 06743504 Dated Feb. 23, 2010.

* cited by examiner

METHOD, AND A DEVICE FOR CONVERTING SPEECH BY REPLACING INARTICULATE PORTIONS OF THE SPEECH BEFORE THE CONVERSION

FIELD OF THE INVENTION

The present invention generally relates to mobile devices and communications networks. In particular the invention concerns interactive speech to text conversion and language translation services.

BACKGROUND OF THE INVENTION

The current trend in portable, e.g. hand-held, terminals drives the evolution strongly towards intuitive and natural user interfaces. In addition to text, images and sound (for example speech) can be recorded at a terminal either for transmission or to control a preferred local or remote (i.e. network-based) functionality. Moreover, payload information can be transferred over the cellular and adjacent fixed networks such as the Internet as binary data representing the underlying text, sound, images, and video. Modem miniature gadgets like mobile terminals or PDAs (Personal Digital Assistant) may thus carry versatile control input means such as a keypad/keyboard, a microphone, different movement or pressure sensors, etc in order to provide the users thereof with a UI (User Interface) truly capable of supporting the greatly diversified data storage and communication mechanisms.

Notwithstanding the ongoing communication and information technology leap also some more traditional data storage solutions such as dictating machines seem to maintain considerable usability value especially in specialized fields such as law and medical sciences wherein documents are regularly created on the basis of verbal discussions and meetings, for example. It's likely that verbal communication is still the fastest and most convenient method of expression to most people and by dictating a memo instead of typing it considerable timesavings can be achieved. This issue also has a language-dependency aspect; writing Chinese or Japanese is obviously more time-consuming than writing most of the western languages, for example. Further, dictating machines and modern counterparts thereof like sophisticated mobile terminals and PDAs with sound recording option can be cleverly utilized in conjunction with other tasks, for example while having a meeting or driving a car, whereas manual typing normally requires a major part of the executing person's attention and cannot definitely be performed if driving a car, etc.

Until the last few years though, the dictation apparatuses have not served all the public needs so well; information may admittedly be easily stored even in real-time by just recording the speech signal via a microphone but often the final archive form is textual and someone, e.g. a secretary, has been ordered to manually clean up and convert the recorded raw sound signal into a final record in a different medium. Such arrangement unfortunately requires a lot of additional (time-consuming) conversion work. Another major problem associated with dictation machines arises from their analogue background and simplistic UI; modifying already stored speech is cumbersome and with many devices still utilizing magnetic tape as a storage medium certain edit operations like inserting a completely new speech portion within the originally stored signal cannot be done. Meanwhile, modern dictation machines utilizing memory chips/cards may comprise limited speech editing options but the possible utilisation is still available only through rather awkward UI comprising only a minimum size and quality LCD (Liquid Crystal Display) screen etc. Transferring stored speech data to another device often requires manual twiddling, i.e. the storage medium (cassette/ memory card) must be physically moved.

Computerized speech recognition systems have been available to a person skilled in the art for a while now. These systems are typically implemented as application-specific internal features (embedded in a word processor, e.g. Microsoft Word XP version), stand-alone applications, or application plug-ins to an ordinary desktop computer. Speech recognition process involves a number of steps that are basically present in all existing algorithms, see FIG. 1 for illustration. Namely, the speech source emitted by a speaking person is first captured 102 via a microphone or a corresponding transducer and converted into digital form with necessary pre-processing 104 that may refer to dynamics processing, for example. Then the digitalized signal is input to a speech recognition engine 106 that divides the signal into smaller elements like phonemes based on sophisticated feature extraction and analysis procedures. The recognition software can also be tailored 108 to each user, i.e. software settings are user-specific. Finally the recognized elements forming the speech recognition engine output, e.g. control information and/or text, are used as an input 110 for other purposes; it may be simply shown on the display, stored to a database, translated into another language, used to execute a predetermined functionality, etc.

Publication U.S. Pat. No. 6,266,642 discloses a portable unit arranged to perform spoken language translation in order to ease communication between two entities having no common language. Either the device itself contains all the necessary hardware and software for executing the whole translation process or it merely acts as a remote interface that initially funnels, by utilizing either a telephone or a video-conference call, the input speech into the translation unit for processing, and later receives the translation result for local speech synthesis. The solution also comprises a processing step during which speech misrecognitions are minimized by creating a number of candidate recognitions or hypotheses from which the user may, via a UI, select the correct one or just confirm the predefined selection.

Despite the many advances the aforementioned and other prior art arrangements suggest for overcoming difficulties encountered in speech recognition and/or machine translation processes, some problems remain unsolved especially in relation to mobile devices. Problems associated with traditional dictation machines were already described hereinbefore. Further, mobile devices such as mobile terminals or PDAs are often relatively small-sized and light apparatuses that cannot include a large-sized display, versatile UI, top notch processing capability/memory capacity or highest-speed transceiver available, which are commonly present in many bigger devices such as desktop computers. Such features, although not absolutely necessary for carrying out the original purpose of a portable device, i.e. transferring speech or storing calendar and other personal information, would be beneficial from the viewpoint of speech-to-text conversions and machine translation. Data format conversions and translations are computationally exhaustive and consume a lot of memory space; these factors will inevitably also lead to higher battery consumption causing a more general usability problem with mobile devices that should always advantageously work location independently. Still further, the existing information transfer capabilities of the mobile devices may be insufficient for transferring all the necessary data to and from the remote station right from the beginning, or the transfer capacity, although in theory being adequate, may not be available for the purpose in full scale due to other ongoing information transfer with higher priority, for example.

SUMMARY OF THE INVENTION

The object of the invention is to alleviate the aforementioned defects found in current speech archiving and speech-to-text conversion arrangements. The object is achieved by a solution wherein a mobile electronic device, e.g. a mobile terminal such as a GSM/UMTS/CDMA phone or a PDA equipped with a suitable wireless communications adapter, comprises a UI that enables the user, preferably through visualization but also via other means, to edit the speech signal before it is exposed to the actual speech recognition and optional, e.g. translation, processes. Moreover, in the solution of the invention communication between the mobile device and an external entity, e.g. a network server residing in the network whereto the mobile device has access, plays an important role. The mobile device and the external entity may be configured to divide the speech to text conversion and further actions based on a number of advantageously user-definable parameter values relating to amongst other possible factors local/remote processing/memory loads, battery status, existence of other tasks and priority thereof, available transmission bandwidth, cost-related aspects, size/duration of the source speech signal, etc. The mobile device and the external entity may even negotiate a suitable co-operation scenario in real-time based on their current conditions, i.e. task sharing is a dynamic process. These issues are discussed hereinafter in more detail. The conversion process as a whole is thus advantageously interactive among the user of the mobile device, the mobile device itself and the external entity. Additionally, the speech recognition process can be personalized in relation to each user, i.e. the recognition engine can be separately configured or trained to adapt to his speech characteristics.

In an aspect of the invention a mobile device operable in a wireless communications network comprises
  speech input means for receiving speech and converting the speech into a representative digital speech signal,
  control input means for communicating an edit command relating to the digital speech signal,
  processing means for performing a digital speech signal editing task responsive to the received edit command,
  at least part of a speech recognition engine for carrying out tasks of a digital speech signal to text conversion, and
  transceiver for exchanging information relating to the digital speech signal and speech to text conversion thereof with an external entity functionally connected to said wireless communications network.

In the above solution the edit command and the resulting task may be related but not limited to one of the following options: deletion of a portion of the speech signal, insertion of a new speech portion in the speech signal, replacement of a portion in the speech signal, change in the amplitude of the speech signal, change in the spectral content of the speech signal, re-recording a portion of the speech signal. Preferably the mobile device includes display means for visualizing the digital speech signal so that the edit commands may relate to the visualized signal portion(s).

The speech recognition engine comprises a framework, e.g. analysis logic, in a form of tailored hardware and/or software that is required for executing at least part of the overall speech-to-text conversion process starting from the digital form speech. A speech recognition process generally refers to an analysis of an audio signal (comprising speech) on the basis of which the signal can be further divided into smaller portions and the portions be classified. Speech recognition thus enables and forms (at least) an important part of the overall speech to text conversion procedure of the invention, although the output of mere speech recognition engine could also be something else than the text representing textually the spoken speech; e.g. in voice control applications the speech recognition engine associates the input speech with a number of predetermined commands the host device is configured to execute. The whole conversion process typically includes a plurality of stages and thus the engine may perform only part of the stages or alternatively, the speech signal may be divided into "parts", i.e. blocks, that are converted by separate entities. How the task sharing shall be performed is discussed hereinafter. The mobile device may in minimum scenario only take care of pre-processing the digital speech in which case the external device will execute the computationally more demanding, e.g. brute-force, analysis steps.

Correspondingly, the information exchange refers to the interaction (information reception and/or transmission) between the mobile device and the external entity in order to execute the conversion process and optional subsequent processes. For example, the input speech signal may be either completely or partially transferred between the aforesaid at least two elements so that the overall task load is shared and/or specific tasks are handled by a certain element as mentioned in the previous paragraph above. Moreover, various parameter, status, acknowledgment, and control messages may be transferred during the information exchange step. Further examples are described in the detailed description. Data formats suitable for carrying speech or text are also discussed.

In another aspect a server operable in a communications network comprises
  data input means for receiving a digital data signal sent by a mobile device, said digital data signal representing speech or at least part thereof,
  at least part of a speech recognition engine for carrying out tasks of a digital data signal to text conversion,
  controlling unit for exchanging control information with the mobile device and determining, based on the control information, the tasks to be performed on the received digital data signal by said at least part of the speech recognition engine, and
  data output means for communicating at least part of the output of the performed tasks to an external entity.

In a further aspect of the invention a system for converting speech into text comprises a mobile device operable in a wireless communications network and a server functionally connected to said wireless communications network, wherein
  said mobile device is configured to receive speech and convert the speech into a representative digital speech signal, to exchange information relating to the digital speech signal and speech to text conversion thereof with the server, and to execute part of the tasks required for carrying out a digital speech signal to text conversion, and
  said server is configured to receive information relating to the digital speech signal and speech to text conversion thereof, and to execute, based on the exchanged information, the remaining part of the tasks required for carrying out a digital speech signal to text conversion.

The "server" refers to an entity, e.g. an electronic apparatus such as a computer that co-operates with the mobile device of the invention in order to perform the speech to text conversion and possible additional processes. The entity may be included in another device, e.g. a gateway or a router, or it can be a completely separate device or a plurality of devices forming the aggregate server entity of the invention.

Yet in a further aspect a method for converting speech into text has the steps of
- receiving, in a mobile device operable in a wireless network, a speech source and converting the speech source into a representative digital speech signal,
- receiving an edit command relating to the digital speech signal,
- processing the digital speech signal in accordance with the edit command,
- exchanging information relating to the digital speech signal and speech to text conversion thereof, and
- executing on the basis of the exchanged information at least part of the tasks required for carrying out a speech to text conversion of the digital speech signal.

Preferably the digitalized speech signal is visualized on a display of the mobile device so that the editing may also be based on the visualization.

The utility of the invention is due to several factors. First, one may generate textual form messages for archiving and/or communications purposes with ease by speaking to his mobile device and optionally editing the speech signal via the UI while the device and the remotely connected entity automatically take care of the exhaustive speech to text conversion. Communication practise between the mobile device and the entity can support a plurality of different means (voice calls, text messages, mobile data transfer protocols, etc) and the selection of a current information exchange method can be even made dynamically based on network conditions, for example. The resulting text and/or the edited speech may be communicated forward to a predetermined recipient by utilizing a plurality of different technologies and communication techniques including the Internet and mobile networks, intranets, voice mail (speech synthesis required to the resulting text), e-mail, SMS/MMS messages, etc. Text as such may be provided in editable or read-only form. Applicable text formats include plain ASCII (and other character sets), Ms Word format, and Adobe Acrobat format, for example.

The mobile device of the invention is advantageously a device or at least incorporated in a device that the user carries with him in any event and thus additional load is not introduced. As the text may be further subjected to a machine translation engine, the invention also facilitates multi-lingual communication. Provided manual editability of the speech signal enables the user to verify and cultivate the speech signal prior to the execution of further actions, which may spare the system from unnecessary processing and occasionally improve the conversion quality as the user can recognize e.g. inarticulate portions in the recorded speech signal and replace them with proper versions. Task sharing between the mobile device and the external entity may be configurable and/or dynamic, which greatly increases the flexibility of the overall solution as available data transmission and processing/memory resources without forgetting various other aspects like battery consumption, service pricing/contracts, user preferences, etc can be taken into account even in real-time upon exploitation of the invention, both mobile device and user specifically. Personalization aspect of the speech recognition part of the invention respectively increases the conversion quality.

The core of current invention can be conveniently expanded via additional services. For example, manual/automatic spelling check or language translation/translation verification services may be introduced to the text either directly by the operator of the server or by a third party to which the mobile device and/or the server transmits the conversion results. In addition, the server side of the invention may be updated with the latest hardware/software (e.g. recognition software) without necessarily raising a need for updating the mobile device(s). Correspondingly, the mobile software can be updated through communication between the mobile device and the server. From a service viewpoint such interaction opens up new possibilities for defining a comprehensive service level hierarchy. As mobile devices, e.g. mobile terminals, typically have different capabilities and the users thereof are able to spend a varying sum of money (e.g. in a form of data transfer costs or direct service fees) for utilizing the invention, diverse versions of the mobile software may be available; differentiation can be implemented via feature locks/activation or fully separate applications for each service level. For example, on one level the network entities shall take care of most of the conversion tasks and the user is ready to pay for it whereas on another level the mobile device shall execute a substantive part of the processing as it bears the necessary capabilities and/or the user does not want to utilize external resources in order to save costs or for some other reason.

In one embodiment of the invention a speech to text conversion arrangement following the afore-explained principles is presented. A person used to dictating memos utilizes his multipurpose mobile device for capturing/editing a voice signal and converting it into text in co-operation with a network server. Variations of the basic arrangement are disclosed.

BRIEF DESCRIPTION OF THE DRAWINGS

In the following, the invention is described in more detail by reference to the attached drawings, wherein.

DETAILED DESCRIPTION OF THE EMBODIMENT OF THE INVENTION

Figure 1:
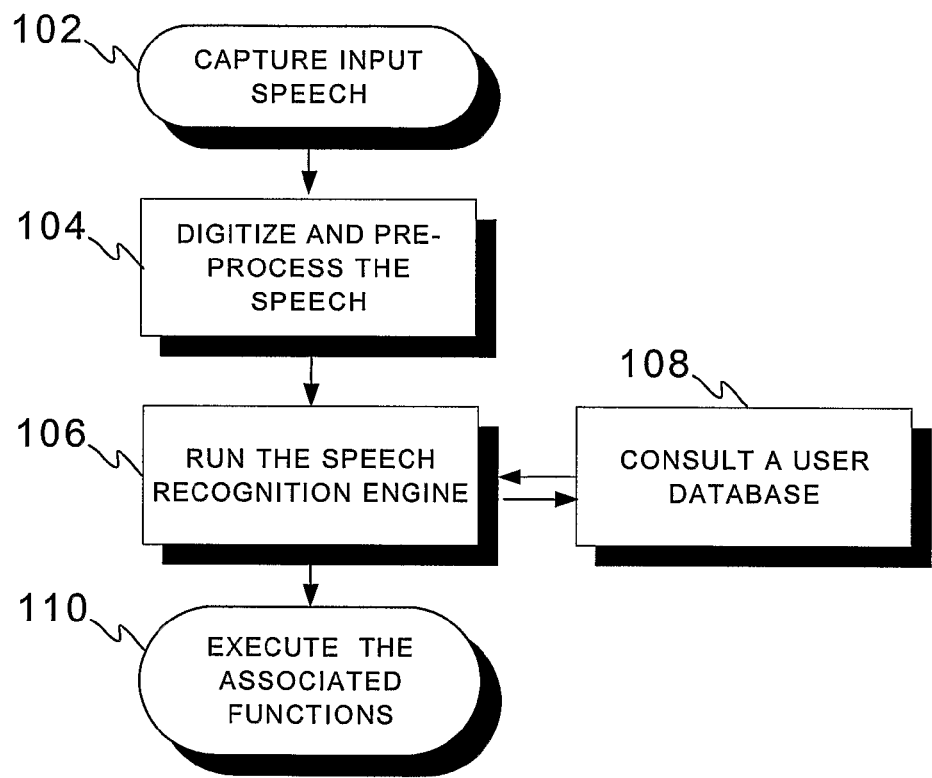
FIG. 1 illustrates a flow diagram of a typical prior art scenario in which an ordinary desktop computer includes speech recognition software.

FIG. 1 was already reviewed in conjunction with the description of related prior art.

Figure 2:
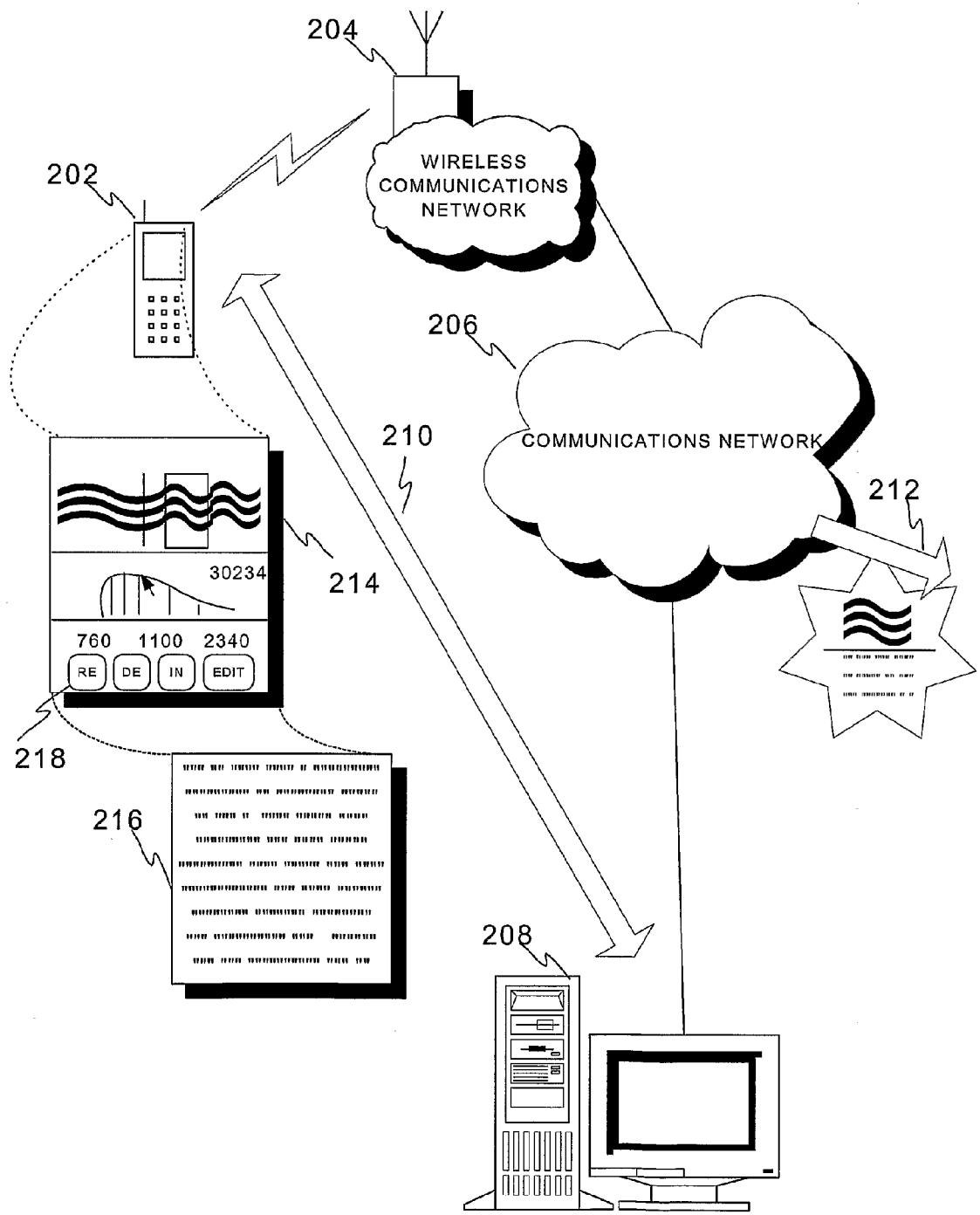
FIG. 2 visualizes the speech to text conversion arrangement of the embodiment of the invention comprising a mobile device and a network server.

FIG. 2 discloses a sketch of a system, by way of example only, adapted to carry out the conversion arrangement of the invention as described hereinbefore under control of a user who favours recording his messages and conversations instead of typing them into his multipurpose mobile electronic device providing a UI to the rest of the system. The mobile electronic device 202, hereinafter device 202, such as mobile terminal or a PDA with internal or external communications means, e.g. a radio frequency transceiver, is operable in a wireless communications network 204 like a cellular network or WLAN (Wireless LAN) network capable of exchanging information with the device 202. Typically wireless networks comprise radio transceivers called e.g. base stations or access points for interfacing the terminal devices.

Wireless communication may also refer to exchanging other types of signals than mere radio frequency signals, said other types of signals including e.g. infrared signals. Operability as a term refers herein to capability of transferring information.

The wireless communications network 204 is further connected to other networks, e.g. a (wired) communications network 206, through appropriate interfacing means, e.g. routers or switches. Conceptually the wireless network 204 may also be located directly in the communications network 206 if it consists of nothing more than a wireless interface for communicating with the wireless terminals in range. One example of the communications network 206 that also encompasses a plurality of sub-networks is the Internet.

Further, a remote entity called a server 208 resides in the communications network 206, or is at least connected thereto via intermediary networks. The device 202 and the server 208 exchange information 210 via networks 204, 206 in order to carry out the overall speech to text conversion process of the invention. Speech recognition engine is located in the server 208 and optionally at least partly in the device 202. The resulting text and/or edited speech may be then communicated 212 towards a remote recipient within or outside said wireless communications 204 and communications 206 networks, an electronic archive (in any network or within the device 202, e.g. on a memory card), or a service entity taking care of further processing, e.g. translation, thereof. Further processing may alternatively/additionally be performed at the server 208.

Blocks 214, 216 represent potential screen snapshots of the device 202 taken upon the execution of the overall text to speech conversion procedure. Snapshot 214 illustrates an option for visualizing, by a conversion application, the input signal (i.e. the input signal comprising at least speech) to the user of the device 202. The signal may indeed be visualized for review and editing by capitalizing a number of different approaches: the time domain representation of the signal may be drawn as an envelope (see the upper curve in the snapshot) or as a more coarse graph (e.g. speech on/off type or other reduced resolution time domain segmentation, in which case the reduced resolution can be obtained from the original signal by dividing the original value range thereof into a smaller number of threshold-value limited sub-ranges, for example) based on the amplitude or magnitude values thereof, and/or a power spectrum or other frequency/alternative domain parameterization may be calculated therefrom (see the lower curve in the snapshot).

Several visualization techniques may even be applied simultaneously, whereby through e.g. a zoom (/unzoom) or some other functionality a certain part of the signal corresponding to a user-defined time interval or a sub-range of preferred parameter values can be shown elsewhere on the screen (see the upper and lower curves of the snapshot 214 presented simultaneously) with increased (/decreased) resolution or via an alternative representation technique. In addition to the signal representation(s), the snapshot 214 shows various numeric values determined during the signal analysis, markers (rectangle) and pointer (arrow, vertical line) to the signal (portion), and current editing or data visualization functions applied or available, see reference numeral 218. In case of a touch-sensitive screen, the user may advantageously paint with his finger or stylus a preferred area of the visualized signal portion (signal may advantageously be scrolled by the user if it does not otherwise fit the screen with a preferred resolution) and/or by pressing another, predetermined area specify a function to be executed in relation to the signal portion underlying the preferred area. A similar functionality may be provided to the user via more conventional control means, e.g. a pointer moving on the screen in response to the input device control signal created by a trackpoint controller, a mouse, a keypad/keyboard button, a directional controller, a voice command receiver, etc.

From the visualized signal the user of the device 202 can rapidly recognize, with only minor experience required, the separable utterances such as words and possible artefacts (background noises, etc) contained therein and further edit the signal in order to cultivate it for the subsequent speech recognition process. If e.g. an envelope of the time domain representation of the speech signal is shown, lowest amplitude portions along the time axis correspond, with a high likelihood, to the silence or background noise while the speech utterances contain more energy. In the frequency domain the dominant peaks are respectively due to the actual speech signal components.

The user may input and communicate signal edit commands to the device 202 via the UI thereof. Signal edit functions associated with the commands shall preferably enable comprehensive inspection and revision of the original signal, few useful examples being thereby next disclosed.

User-defined (for example, either selected with movable markers/pointers or "painted" on the UI such as the touch screen as explained above) portion of the signal shall be replaceable with another, either already stored or real-time recorded portion. Likewise, a portion shall be deletable so that the adjacent remaining portions are joined together or the deleted portion is replaced with some predetermined data representing e.g. silence or low-level background noise. At the ends of the captured signal such joining procedure is not necessary. The user may be allocated with a possibility to alter, for example unify, the amplitude (relating volume/loudness) and spectral content of the signal, which may be carried out through different gain control means, normalization algorithms, an equalizer, a dynamic range controller (including e.g. a noise gate, expander, compressor, limiter), etc. Noise reduction algorithms for clearing up the degraded speech signal from background fuss are more complex than noise gating but advantageous whenever the original acoustic signal has been produced in noisy conditions. Background noise shall preferably be at least pseudo-stationary to guarantee adequate modelling accuracy. The algorithms model background noise spectrally or via a filter (coefficients) and subtract the modelled noise estimate from the captured microphone signal either in time or spectral domain. In some solutions the noise estimate is updated only when a separate voice activity detector (VAD) notifies there is no speech in the currently analysed signal portion. The signal may generally be classified as including noise only, speech only, or noise+speech.

The conversion application may store a number of different signal editing functions and algorithms that are selectable by the user as such, and at least some of them may be further tailored by the user for example via a number of adjustable parameters.

Cancel functionality, also known as "undo" functionality, being e.g. a program switch for reverting to the signal status before the latest operation, is preferably included in the application so as to enable the user to safely experiment with the effects of different functionalities while searching for an optimal edited signal.

Whenever the editing occurs at least partially simultaneously with the speech recognition, even only the so-far resulted text may be visualized on the screen of the device 202. This may require information transfer between the server 208 and the device 202, if the server 208 has participated in converting the particular speech portion from which the so-far resulted text has originated. Otherwise, snapshot 216 is materialized after completing the speech to text conversion. Alternatively, the text as such is never shown to the user of the device 202, as it is, by default, directly transferred forward to the archiving destination or a remote recipient, preferably depending on the user-defined settings.

One setting may determine whether the text is automatically displayed on the screen of the device 202 for review, again optionally together with the original or edited speech signal, i.e. the speech signal is visualized as described hereinbefore whereas the resulting text portions such as words are shown above or below the speech as being aligned in relation to the corresponding speech portions. Data needed for the alignment is created as a by-product in the speech recognition process during which the speech signal is already analysed in portions. The user may then determine whether he is content with the conversion result or decide to further edit the preferred portions of the speech (even re-record those) and subject them to a new recognition round while keeping the remaining portions intact, if any. This type of recursive speech to text conversion admittedly consumes more time and resources than the more straightforward "edit once and convert"-type basic approach but permits more accurate results to be achieved. Alternatively, at least part of the resulting text can be corrected by manually inputting corrections in order to omit additional conversion rounds without true certainty of more accurate results.

Although the input audio signal comprising the speech is originally captured by the device 202 through a sensor or a transducer such as a microphone and then digitalized via an A/D converter for digital form transmission and/or storing, even the editing phase may comprise information transfer between the device 202 and other entities such as the server 208 as anticipated by the above recursive approach. Respectively, the digital speech signal may be so large in size that it cannot be sensibly stored in the device 202 as such; therefore it has to be compressed locally, optionally in real-time during capturing, utilizing a dedicated speech or more generic audio encoder such as GSM, TETRA, G.711, G.721, G.726, G.728, G.729, or various MPEG-series coders. In addition, or alternatively, the digital speech signal may, upon capturing, be transmitted directly (including the necessary buffering though) to an external entity, e.g. the server 208, for storage and optionally encoding, and be later retrieved back to the device 202 for editing. In extreme case the editing takes place in the server 208 such that the device 202 mainly acts as a remote interface for controlling the execution of the above-explained edit functions in the server 208. For that purpose, both speech data (for visualization at the device 202) and control information (edit commands) have to be transferred between the two entities 202, 208.

Information exchange 210 as a whole may incorporate a plurality of different characteristics of the conversion arrangement. In one aspect of the invention, the device 202 and the server 208 share the tasks relating to the speech to text conversion. Task sharing inherently implies also information exchange 210 as at least portion of the (optionally encoded) speech has to be transferred between the device 202 and the server 208.

Conversion applications in the device 202 and optionally in the server 208 include or have at least access to settings for task (e.g. function, algorithm) sharing with a number of parameters, which may be user-definable or fixed (or at least not freely alterable by the user). The parameters may either explicitly determine how the tasks are divided between the device 202 and the server 208, or only supervise the process by a number of more generic rules to be followed. E.g. certain tasks may be always carried out by the device 202 or by the server 208. The rules may specify sharing of the processing load, wherein either relative or absolute load thresholds with optional further adaptivity/logic are determined for the loads of both the device 202 and the server 208 so as to generally transfer part of the processing and thus source data from the more loaded entity to the less loaded one. If the speech to text conversion process is implemented as a subscription based service including a number of service levels, some conversion features may be disabled on a certain (lower) user level by locking them in the conversion application, for example. Locking/unlocking functionality can be carried out through a set of different software versions, feature registration codes, additional downloadable software modules, etc. In the event that the server 208 cannot implement some of the lower level permitted tasks requested by the device 202 e.g. during a server overload or server down situation, it may send an "unacknowledgement" message or completely omit sending any replies (often acknowledgements are indeed sent as presented in FIG. 4) so that the device 202 may deduce from the negative or missing acknowledgement to execute the tasks by itself whenever possible.

The device 202 and the server 208 may negotiate a co-operation scenario for task sharing and resulting information exchange 210. Such negotiations may be triggered by the user (i.e. selecting an action leading to the start of the negotiations), in a timed manner (once a day, etc), upon the beginning of each conversion, or dynamically during the conversion process by transmitting parameter information to each other in connection with a parameter value change, for example. Parameters relating to task sharing include information about e.g. one or more of the following: current processing or memory load, battery status or its maximum capacity, the number of other tasks running (with higher priority), available transmission bandwidth, cost-related aspects such as current data transmission rate for available transfer path(s) or server usage cost per speech data size/duration, size/duration of the source speech signal, available encoding/decoding methods, etc.

The server 208 is in most cases superior to the device 202 as to the processing power and memory capacity, so therefore load comparisons shall be relative or otherwise scaled. The logic for carrying out task sharing can be based on simple threshold value tables, for example, that include different parameters' value ranges and resulting task sharing decisions. Negotiation may, in practise, be realized through information exchange 210 so that either the device 202 or the server 208 transmits status information to the other party that determines an optimised co-operation scenario and signals back the analysis result to initiate the conversion process.

The information exchange 210 also covers the transmission of conversion status (current task ready/still executing announcements, service down notice, service load figures, etc) and acknowledgement (reception of data successful/unsuccessful, etc) signalling messages between the device 202 and the server 208. Whenever task-sharing allocations are fixed, transferring related signalling is however not mandatory.

Information exchange 210 may take place over different communication practises, even multiple ones simultaneously (parallel data transfer) to speed things up. In one embodiment, the device 202 establishes a voice call to the server 208 over which the speech signal or at least part of it is transmitted. The speech may be transferred in connection with the capturing phase, or after first editing it in the device 202. In another embodiment, a dedicated data transfer protocol such as the GPRS is used for speech and other information transfer.

The information may be encapsulated in various data packet/frame formats and messages such as SMS, MMS, or e-mail messages.

The intermediary results provided by the device 202 and the server 208, e.g. processed speech, speech recognition parameters or text portions, shall be combined in either of said two devices 202, 208 to create the final text. Depending on the nature of the sharing (do the intermediary results represent the corresponding final text portions) the intermediary results may be alternatively transmitted as such to a further receiving entity who may perform the final combination process by applying information provided thereto by the entities 202, 208 for that purpose.

Additional services such as spell checking, machine/human translation, translation verification or further text to speech synthesis may be located at the server 208 or another remote entity whereto the text is transmitted after completing the speech to text conversion. In the event that the aforesaid intermediary results refer directly to text portions, the portions may be transmitted independently immediately following their completion, provided that the respective additional information for combining is also ultimately transmitted.

In one implementation of the invention, the speech recognition engine of the invention residing in the server 208 and optionally in the device 202 can be personalized to utilize each user's individual speech characteristics. This indicates inputting the characteristics to a local or a remote database accessible by the recognition engine on e.g. user ID basis; the characteristics can be conveniently obtained by training the engine by providing either freely selected speech sample/corresponding text pairs to the engine or by uttering the expressions the engine is configured to request from each user based on e.g. a predefined (language-dependent) compromise between maximizing the versatility and representational value of the information space and minimizing the size thereof. Based on the analysis of the training data, the engine then determines personalized settings, e.g. recognition parameters, to be used in the recognition. Optionally the engine has been adapted to continuously update the user information (~user profiles) by utilizing the gathered feedback; the differences between the final text corrected by the user and the automatically produced text can be analysed.

Figure 3:
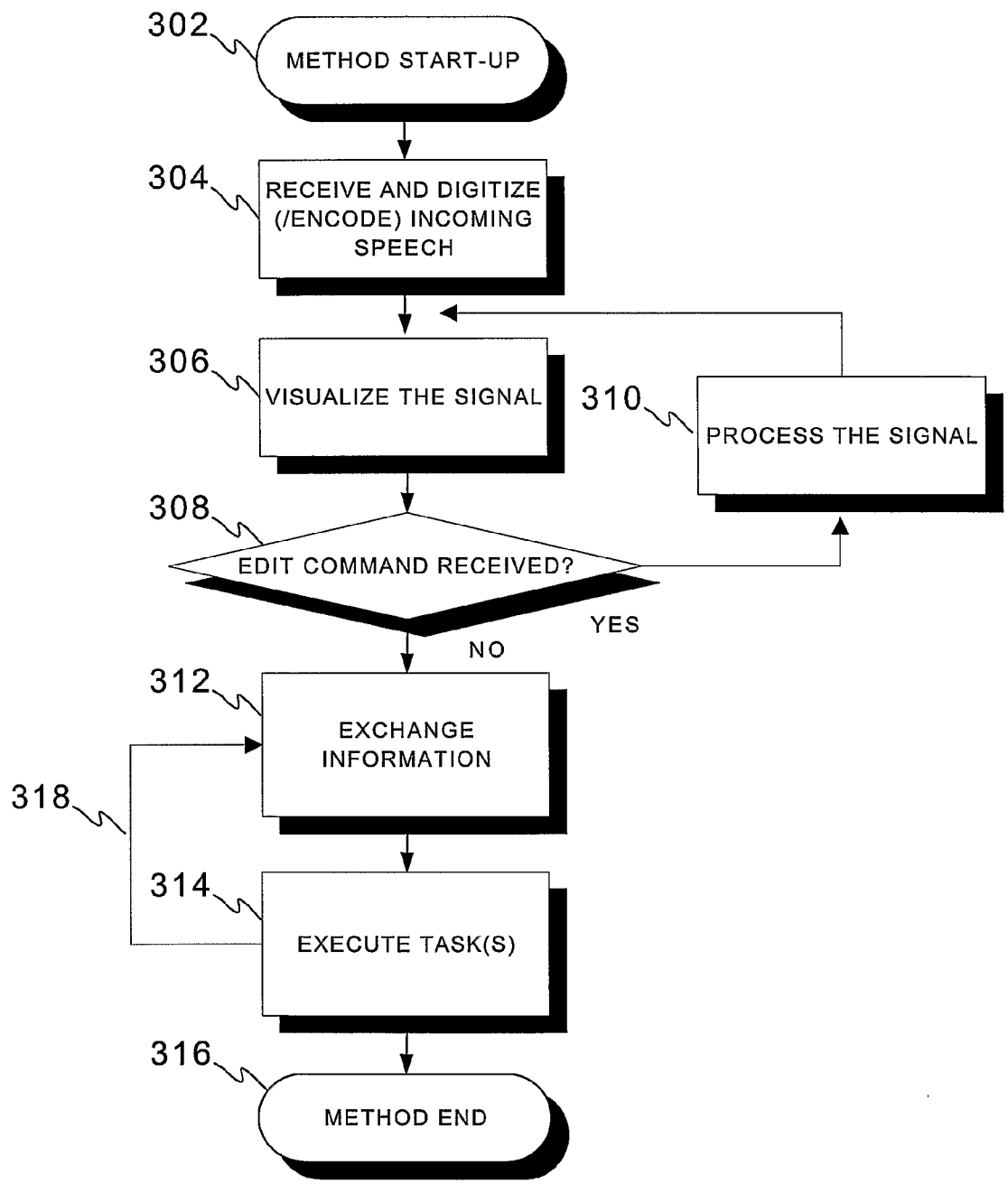
FIG. 3 discloses a flow diagram of one option for carrying out the method of the invention.

FIG. 3 discloses a flow diagram of a method according to the invention. In method start-up step 302 the initial actions enabling the execution of the further method steps are performed. E.g. the necessary applications, one or more, relating to the overall speech to text conversion process including editing are launched in the device 202, and the respective service is activated on the server 208 side. Should the user of the device 202 desire personalized recognition phase, step 302 optionally includes registration or logging in to the service. This also takes place whenever the service is targeted to registered users only (private service) and/or offers a plurality of service levels. For example, in an event of multiple users occasionally exploiting the conversion arrangement through the very same terminal, the registration/log-in may take place in both the device 202 and the server 208, possibly automatically based on information stored in the device 202 and current settings. Further, during start-up step 302 the settings of the conversion process may be changed and the parameter values determining e.g. various user preferences (default speech processing algorithms, encoding method, etc) set. Still further, the device 202 may negotiate with the server 208 about a preferable co-operation scenario in step 302 as described hereinbefore.

In step 304 the capture of the audio signal including the speech to be converted is started, i.e. transducer(s) of the device 202 begin to translate the input acoustical vibration into an electric signal digitalized with an A/D converter that may be implemented as a separate chip or combined with the transducer(s). Either the signal will be first locally captured at the device 202 as a whole before any further method steps are executed, or the capturing runs simultaneously with a number of subsequent method steps after the necessary minimum buffering of the signal has been first carried out. Step 304 also indicates optional encoding of the signal and information exchange between the device 202 and the server 208, if at least part of the signal is to be stored in the server 208 and the editing takes place remotely from the device 202, or the editing occurs in data pieces that are transferred between the device 202 and the server 208. As an alternative to the server 208, some preferred other entity could be used as a mere temporary data storage, if the device 202 does not contain enough memory for the purpose. Therefore, although not being illustrated to the widest extent for clarity reasons, the steps 302-310 presented in FIG. 3 may comprise additional data transfer between the device 202 and the server 208/other entity, and the explicitly visualized route is simply the most straightforward option.

In step 306 the signal is visualized on the screen of the device 202 for editing. The utilized visualization techniques may be alterable by the user as reviewed in the description of FIG. 2. The user may edit the signal in order to cultivate it to make it more relevant to the recognition process, and introduce preferred signal inspection functions (zoom/unzoom, different parametric representations), signal shaping functions/algorithms, and even completely re-record/insert/delete necessary portions. When the device receives an edit command from the user, see reference numeral 308, the associated action is performed in processing step 310 preferably including also the "undo" functionality. When the user is content with the editing result, the loop of steps 306, 308, and 310 is left behind, and the method execution continues from step 312 indicating information exchange between the device 202 and the server 208. The information relates to the conversion process and includes e.g. the edited (optionally also encoded) speech. Additionally or alternatively (if e.g. the device 202 or server 208 is unable to take care of a task), necessary signalling about task sharing details (further negotiation and related parameters, etc) is transferred during this step. In step 314 the tasks of the recognition process are being carried out as determined by the selected negotiation scenario. Numeral 318 refers to optional further information exchange for transferring intermediary results such as processed speech, calculated speech recognition parameters, text portions or further signalling between the entities 202 and 208. The separate text portions possibly resulting from the task sharing shall be combined when ready to construct the complete text by the device 202, the server 208, or some other entity. The text may be reviewed to the user of the device 202 and portions thereof be subjected to corrections, or even portions of the original speech corresponding to the produced defective text may be then targeted for further conversion rounds with optionally amended settings, if the user believes it to be worth trying. The final text can be considered to be transferred to the intended location (recipient, archive, additional service, etc) during the last visualized step 316 denoting also the end of the method execution. In case the output (translated text, synthesized speech, etc) from the additional service is transmitted forward, the additional service entity shall address it based on the received service order message from the sender party, e.g. the device 202 or server 208, or remit the output back to them to be delivered onwards to another location.

Figure 4:
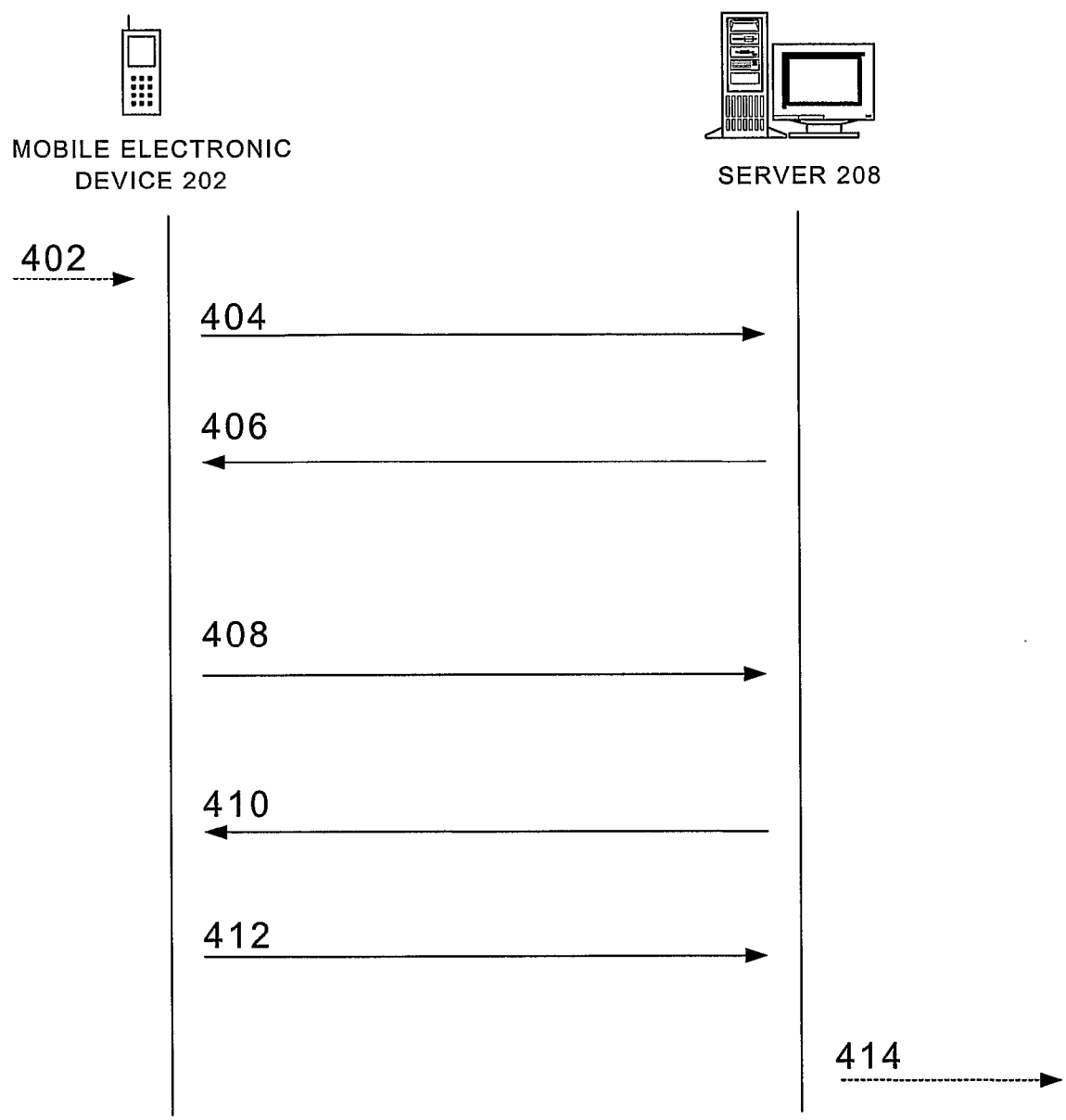
FIG. 4 discloses a signalling chart showing information transfer possibilities for implementing the current invention.

Signalling chart of FIG. 4 discloses one option for information transfer between the device 202 and the server 404 in the spirit of the invention. It should be noted however that the presented signals reflect only one, somewhat basic case wherein multiple conversion rounds etc are not utilized. Arrow 402 corresponds to the audio signal including the speech to be converted. Signal 404 is associated with a request sent to the server 208 indicating the preferred co-operation scenario for the speech to text conversion process from the standpoint of the device 202. The server 208 answers 406 with an acknowledgement including a confirmation of the accepted scenario, which may differ from the requested one, determined based on e.g. user levels and available resources. The device 202 transmits speech recognition parameter data or portion of the speech signal to the server 208 as shown by arrow 408. The server 208 performs the negotiated part of the processing and transmits the results to the device 202 or just acknowledges their completion 410. The device 202 then transmits approval/acknowledgement message 412 optionally including the whole conversion result to be further processed and/or transmitted to the final destination. The server 208 optionally performs at least part of the further processing and transmits the output forward 414.

Figure 5:
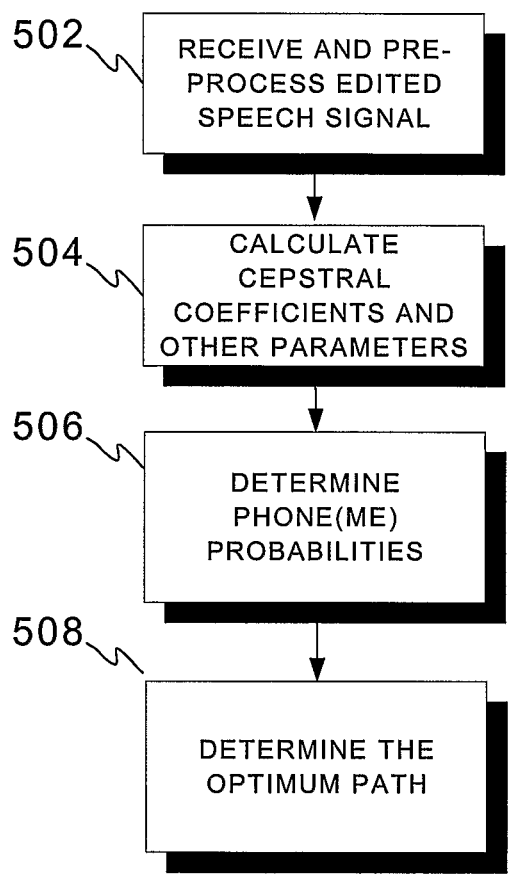
FIG. 5 represents speech recognition engine internals with a number of tasks.
Figure 5:
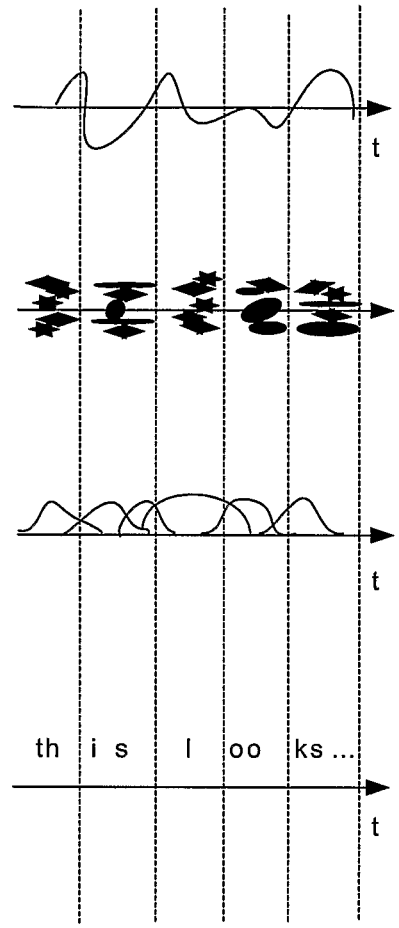

A non-limiting example of a speech recognition process including a number of steps is next previewed to provide a skilled person with insight into the utilization of the task sharing aspect of the current invention. FIG. 5 discloses tasks executed by a basic speech recognition engine, e.g. a software module, in the form of a flow diagram and illustrative sketches relating to the tasks' function. It is emphasized that the skilled person can utilize any suitable speech recognition technique in the context of the current invention, and the depicted example shall not be considered as the sole feasible option.

The speech recognition process inputs the digital form speech (+additional noise, if originally present and not removed during the editing) signal that has already been edited by the user of the device 202. The signal is divided into time frames with duration of a few tens or hundreds of milliseconds, for example, see numeral 502 and dotted lines. The signal is then analysed on a frame-by-frame basis utilizing e.g. cepstral analysis during which a number of cepstral coefficients are calculated by determining a Fourier transform of the frame and decorrelating the spectrum with a cosine transform in order to pick up the dominant coefficients, e.g. 10 first coefficients per frame. Also derivative coefficients may be determined for estimating the speech dynamics 504.

Next the feature vector comprising the obtained coefficients and representing the speech frame is subjected to an acoustic classifier, e.g. a neural network classifier that associates the feature vectors with different phonemes 506, i.e. the feature vector is linked to each phoneme with a certain probability. The classifier may be personalized by adjustable settings or training procedures discussed hereinbefore.

Then the phoneme sequences that can be constructed by concatenating the phonemes possibly underlying the feature vectors are analysed with a HMM (Hidden Markov Model) or other suitable decoder that determines the most likely phoneme (and corresponding upper level element, e.g. word) path 508 (forming a sentence "this looks . . . " in the figure) from the sequences by utilizing e.g. a context dependent lexical and/or grammatical language model and related vocabulary. Such path is often called a Viterbi path and it maximises the posteriori probability for the sequence in relation to the given probabilistic model.

Pondering the task sharing aspect of the invention, the sharing could take place between the steps 502, 504, 506, 508 and/or even within them. In one option, the device 202 and the server 208 may, based on predetermined parameters/rules or dynamic/real-time negotiations, allocate the tasks behind the recognition steps 502, 504, 506, and 508 such that the device 202 takes care of a number of steps (e.g. 502) whereupon the server 208 executes the remaining steps (504, 506, and 508 respectively). Alternatively, the device 202 and the server 208 shall both execute all the steps but only in relation to a portion of the speech signal, in which case the speech-to-text converted portions shall be finally combined by the device 202, the server 208, or some other entity in order to establish the full text. Yet in an alternative, the above two options can be exploited simultaneously; for example, the device 202 takes care of at least one task for the whole speech signal (e.g. step 502) due to e.g. a current service level explicitly defining so, and it also executes the remaining steps for a small portion of the speech concurrent with the execution of the same remaining steps for the rest of the speech by the server 208. Such flexible task division can originate from time-based optimisation of the overall speech to text conversion process, i.e. it is estimated that by the applied division the device 202 and the server 208 will finish their tasks substantially simultaneously and thus the response time perceived by the user of the device 202 is minimized from the service side.

Figure 6:
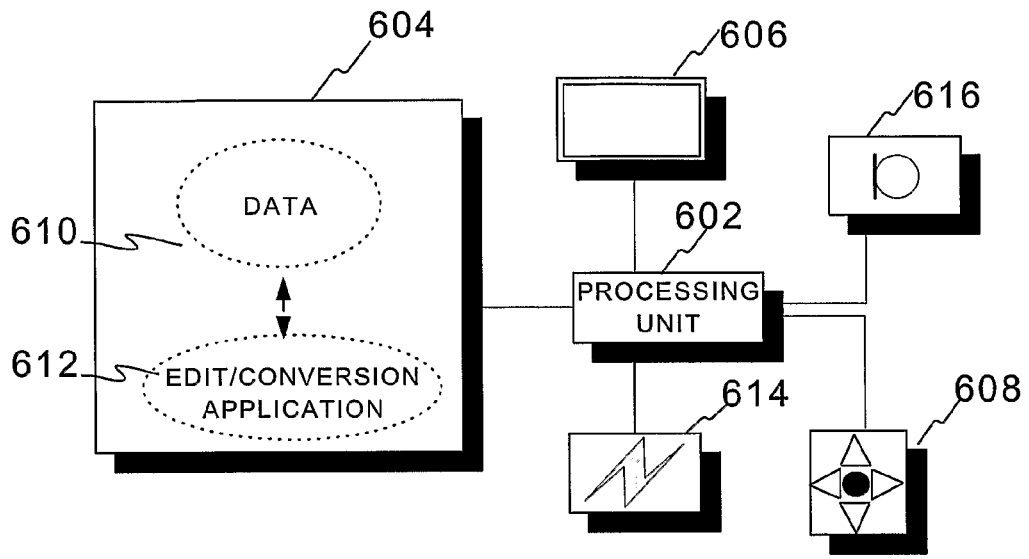
FIG. 6 is a block diagram of a mobile device of the invention.

Modern speech recognition systems may reach a recognition rate of around 80% if the input speech signal is of good quality (free of disturbances and background noise, etc) but the rate may decrease down to 50% or so in more challenging conditions. Therefore some sort of editing as discussed hereinbefore may noticeably enhance the performance of the basic recognition engine FIG. 6 discloses one option for basic components of the mobile electronic device 202 such as a mobile terminal or a PDA either with internal or external communications capabilities. Memory 604, divided between one or more physical memory chips, comprises necessary code, e.g. in a form of a computer program/application 612 for enabling speech editing and at least partial speech to text conversion (~speech recognition engine), and other data 610, e.g. current settings, digital form (optionally encoded) speech and speech recognition data. The memory 604 may further refer to a preferably detachable memory card, a floppy disc, a CD-ROM or a fixed storage medium such as a hard drive. The memory 604 may be e.g. ROM or RAM by nature. Processing means 602, e.g. a processing/controlling unit such as a microprocessor, a DSP, a micro-controller or a programmable logic chip, optionally comprising a plurality of co-operating or parallel (sub-)units is required for the actual execution of the code stored in memory 604. Display 606 and keyboard/keypad 608 or other applicable control input means (e.g. touch screen or voice control input) provide the user of the device 202 with device control and data visualization means (~user interface). Speech input means 616 include a sensor/transducer, e.g. a microphone and an A/D converter, to receive an acoustic input signal and to transform the received acoustic signal into a digital signal. Wireless data transfer means 614, e.g. a radio transceiver (GSM, UMTS, WLAN, Bluetooth, infrared, etc) is required for communication with other devices.

Figure 7:
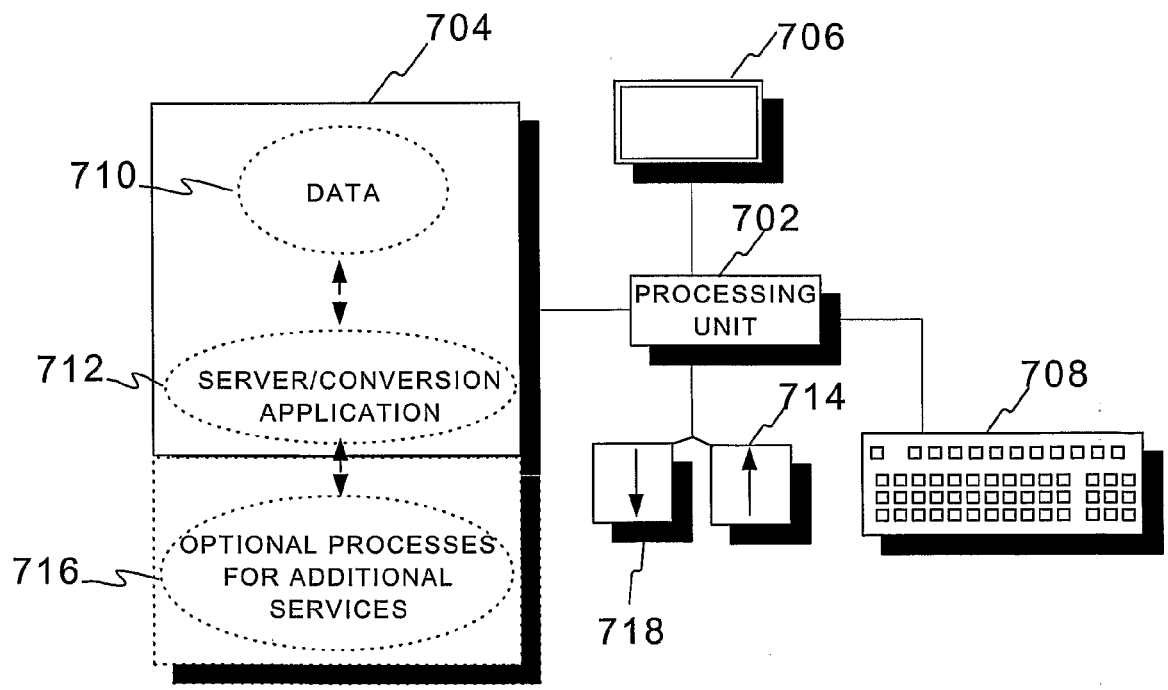
FIG. 7 is a block diagram of a server entity of the invention.

FIG. 7 discloses a corresponding block diagram of the server 208. The server comprises a controlling unit 702 and a memory 704. The controlling unit 702 for controlling the speech recognition engine and other functionalities of the server 208 including the control information exchange, which may in practise take place through the data input/output means 714/718 or other communications means, can be implemented as a processing unit or a plurality of co-operating units like the processing means 602 of the mobile electronic device 202. The memory 704 comprises the server side application 712 to be executed by the controlling unit 702 for carrying out at least some tasks of the overall speech to text conversion process, e.g. a speech recognition engine. See the previous paragraph for examples of possible memory implementations. Optional applications/processes 716 may be provided to implement additional services. Data 710 includes speech data, speech recognition parameters, settings, etc. It's evident that at least some required information may be located in a remote storage facility, e.g. a database, whereto the server 808 has an access through e.g. data input means 714 and output means 718. Data input means 714 comprises e.g. a network interface/adapter (Ethernet, WLAN, Token Ring, ATM, etc) for receiving speech data and control information sent by the device 202. Likewise, data output means 718 are included for transmitting e.g. the results of the task sharing forward. In practise data input means 714 and output means 718 may be combined to a single multidirectional interface accessible by the controlling unit 702.

The device 202 and the server 208 may be realized as a combination of tailored software and more generic hardware, or alternatively, through specialized hardware such as programmable logic chips.

Application code, e.g. application 612 and/or 712, defining a computer program product for the execution of the current invention can be stored and delivered on a carrier medium like a floppy, a CD, a hard drive or a memory card.

The scope of the invention can be found in the following claims. However, utilized devices, method steps, task sharing details, etc may depend on a particular use case still converging to the basic ideas presented hereinbefore, as appreciated by a skilled reader.

The invention claimed is:

1. A mobile device operable in a wireless communications network comprising:
 a speech input device that receives speech and converts the speech into a representative digital speech signal, said speech input device converting the received speech into representative digital speech signal without any speech-to-text conversion of the representative digital speech signal;
 a control input device that, prior to any speech-to-text conversion of the representative digital speech signal, communicates an edit command inputted by a user, the edit command relating to and for editing audible speech content of a user-defined portion of the representative digital speech signal, the user input edit command is one of a group consisting of i) a deletion of a portion of the representative digital speech signal, ii) an insertion of a speech portion in the representative digital speech signal, iii) re-recording of a portion of the representative digital speech signal, and iv) replacement of a portion of the representative digital speech signal where the user-defined portion of the representative digital speech signal is an inarticulate portion in the representative digital speech signal being replaced with a new version recording of the portion of the representative digital speech signal;
 a processing device that performs a digital speech signal editing task of the representative digital speech signal portion to edit the audible speech content thereof responsive to the received edit command, said speech signal editing task being free of speech-to-text conversion and providing a user-directed edited digital speech signal portion;
 at least part of a speech recognition engine for carrying out tasks of the edited digital speech signal portion to text conversion; and
 a transceiver that exchanges information relating to the digital speech signal portion and speech to text conversion thereof with an external entity functionally connected to said wireless communications network (614), wherein said mobile device is configured to transmit text resulting from the speech to text conversion to another entity for at least one of a group consisting of i) storage, ii) archiving, and iii) a further processing task selected from a group consisting of spell-checking, machine translation, human translation, translation verification, and text to speech synthesis.

2. The mobile device according to claim 1, configured to share the execution of tasks required for carrying out the speech to text conversion with the external entity, said mobile device being further configured to share the execution of tasks so as to optimize a factor according to predetermined criteria, said factor being selected from a group consisting of:
 execution time of the speech to text conversion, conversion costs, amount of required data transfer, processing load, and memory load.

3. The mobile device according to claim 2, wherein the exchanged information includes at least one element selected from a group consisting of:
 data for allocating or performing the tasks of the speech to text conversion, processing load, memory load, a battery status, a battery capacity, information about tasks running with higher priority, available transmission bandwidth, data transmission rate, external entity usage cost per speech data size or duration, size or duration of the digital speech signal, available encoding/decoding method, conversion status, task status, device unavailability notice, intermediary speech to text conversion result, digital speech, digital encoded speech, speech recognition parameter, and text.

4. The mobile device according to claim 2, configured to utilize intermediary results of the speech to text conversion provided by both the device and the external entity in order to produce the text.

5. The mobile device according to claim 2, configured to transmit intermediary results of the speech to text conversion to said external entity, so as to enable the another entity to perform at least one of the following:
 to combine the intermediary results acquired from the mobile device with locally obtained results to produce the text, subject the intermediary results to additional processing in order to produce the text.

6. The mobile device according to claim 1, further comprising a display device for visualizing at least part of the digital speech signal, including the digital speech signal portion, whereupon said control input device is configured to communicate an edit command relating to said visualized part, wherein the visualization of the signal comprises at least one element selected from a group consisting of:
 a time-domain representation of the signal, a frequency-domain representation of the signal, a parameterization of the signal, a zoom or unzoom operation targeted to the visualized signal, a numeric value determined from a user-defined portion of the signal, a pointer to a userdefined location in the visualized signal, and highlighting of a user-defined sub-area of the visualized signal, and
 wherein said mobile device is further configured to visualize at least a portion of the text resulted from the conversion as aligned in relation to the corresponding visualized portion of the signal.

7. The mobile device according to claim 1, wherein said at least part of the speech recognition engine comprises an element selected from a group consisting of: preprocessor for dividing the digital speech signal into frames of a predetermined length, audio encoder for compressing the digital speech signal, cepstral analyser, acoustic classifier, neural network classifier, best path decoder, HMM (Hidden Markov Model) decoder, lexical language model, grammatical language model, context dependent lexical language model, context dependent grammatical language model, user-specific settings, and vocabulary.

8. The mobile device according to claim 1, wherein said exchanged information includes an element selected from a group consisting of:
digital form speech, digital encoded speech, device status information, message acknowledgment, control information, edit command, task sharing negotiation data, parameter value related to task sharing, task status, service down notice, load figure, intermediary speech to text conversion result.

9. The mobile device according to claim 1, wherein said information is exchanged by utilizing at least one communication practice selected from a group consisting of:
an SMS (Short Message Service) message, an MMS (Multimedia Message Service) message, an e-mail, a data call, a GPRS (Global Packet Radio Service) connection, and a voice call.

10. A method for converting speech into text having the steps of:
receiving, in a mobile device operable in a wireless network, a speech source and converting the speech source into a representative digital speech signal without performing any speech-to-text conversion;
prior to performing any speech-to-text conversion of the representative digital speech signal, receiving an edit command inputted by a user, the edit command relating to and for editing audible speech content of a user-defined portion of the digital speech signal by the mobile device, the user input edit command being one of a group consisting of i) a deletion of a portion of the representative digital speech signal, ii) an insertion of a speech portion in the representative digital speech signal, iii) re-recording of a portion of the representative digital speech signal, and iv) replacement of a portion of the representative digital speech signal where the user-defined portion of the representative digital speech signal is an inarticulate portion in the representative digital speech signal being replaced with a new version recording of the portion of the representative digital speech signal;
processing the digital speech signal portion in accordance with the edit command to edit the audible speech content thereof said processing being free of any speech-to-text conversion and providing a user-directed edited digital speech signal portion;
exchanging information relating to the edited digital speech signal portion and speech to text conversion thereof;
executing on the basis of the exchanged information at least part of the tasks required for carrying out a speech to text conversion of the digital speech signal portion; and
visualizing at least part of the digital speech signal on a display of the mobile device, whereupon the received edit command further relates to said visualized part.

11. A computer executable program stored on a computer-readable code device adapted, when run on a computer, to carry out the method steps as defined by claim 10.

12. A non-transitory carrier medium comprising the computer executable program of claim 11, wherein said non-transitory carrier medium includes at least one element selected from a group consisting of: a memory card, a floppy disc, a CD-ROM, and a hard drive.

13. A server operable in a communications network comprising:
a data input device that
i) receives a digital data signal sent by a mobile device, said digital data signal representing speech or at least part thereof free of any speech to text conversion, and
ii) receives a speech edit command inputted by a user, the speech edit command to edit audible speech content of a user-defined portion of said digital data signal representing said speech via the mobile device, the speech edit command providing a user-directed edit of the digital speech signal portion prior to any speech to text conversion of said digital data signal representing speech or at least part thereof, the user input edit command is one of a group consisting of i) a deletion of a portion of the representative digital speech signal, ii) an insertion of a speech portion in the representative digital speech signal, iii) re-recording of a portion of the representative digital speech signal, and iv) replacement of a portion of the representative digital speech signal where the user-defined portion of the representative digital speech signal is an inarticulate portion in the representative digital speech signal being replaced with a new version recording of the portion of the representative digital speech signal;
at least part of a speech recognition engine for carrying out tasks of the edited digital data signal to text conversion;
a controlling unit for exchanging control information with the mobile device, performing a digital speech signal editing task to edit the audible speech content of the user-defined digital speech signal portion responsive to the received edit command, and determining, based on the control information, the tasks to be performed on the received digital data signal by said at least part of the speech recognition engine, the digital speech signal editing task being performed prior to any speech signal to text conversion of the user-defined portion of said digital data signal representing said speech and providing a user-directed edit of the digital speech signal portion; and
a data output device for communicating at least part of the output of the performed tasks to an external entity.

14. A system for converting speech into text comprising a mobile device operable in a wireless communications network and a server functionally connected to said wireless communications network, wherein
said mobile device is configured to:
receive speech from a user and convert the speech into a representative digital speech signal without performing any speech-to-text conversion,
prior to performing any speech-to-text conversion of the representative digital speech signal, to receive user-inputted edit command from the user, the edit command relating to and for editing audible speech content of a user-defined portion of the digital speech signal and being one of a group consisting of i) a deletion of a portion of the representative digital speech signal, ii) an insertion of a speech portion in the representative digital speech signal, iii) re-recording of a portion of the representative digital speech signal, and iv) replacement of a portion of the representative digital speech signal where the user-defined portion of the representative digital speech signal is an inarticulate portion in the representative digital speech signal being replaced with a new version recording of the portion of the representative digital speech signal, to process the digital speech signal portion in accordance with the edit command to edit the audible speech content thereof, to exchange information relating to the digital speech signal and speech to text conversion thereof with the server, and to execute part of the tasks required for carrying out an edited digital speech signal to text conversion, said processing step being prior of speech-to-text conversion and providing a user-directed edit of the digital speech signal portion, and said server is configured to receive information relating to the digital speech signal and speech to text conversion thereof, and to execute, based on the exchanged information, the remaining part of the tasks required for carrying out a digital speech signal to text conversion.

* * * * *